United States Patent
Baldauf et al.

(10) Patent No.: US 9,624,590 B2
(45) Date of Patent: Apr. 18, 2017

(54) METHOD FOR RECOVERING AN ELECTROPOSITIVE METAL FROM A METAL CARBONATE

(71) Applicant: SIEMENS AKTIENGESELLSCHAFT, Munich (DE)

(72) Inventors: Manfred Baldauf, Erlangen (DE);
Guenter Schmid, Homhofen (DE);
Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/412,792

(22) PCT Filed: Jun. 25, 2013

(86) PCT No.: PCT/EP2013/063198
§ 371 (c)(1),
(2) Date: Jan. 5, 2015

(87) PCT Pub. No.: WO2014/005878
PCT Pub. Date: Jan. 9, 2014

(65) Prior Publication Data
US 2015/0159285 A1 Jun. 11, 2015

(30) Foreign Application Priority Data
Jul. 5, 2012 (DE) .................. 10 2012 211 710

(51) Int. Cl.
*C25C 1/00* (2006.01)
*C25C 3/00* (2006.01)
(Continued)

(52) U.S. Cl.
CPC ...... *C25C 1/00* (2013.01); *B01J 8/24* (2013.01); *C22B 26/00* (2013.01); *C22B 26/12* (2013.01);
(Continued)

(58) Field of Classification Search
CPC ...... C25B 1/02–1/12; C25B 1/24; C25B 1/26; C25B 15/08; B01J 8/24; C22B 26/00;
(Continued)

(56) References Cited

U.S. PATENT DOCUMENTS 3,540,841 A * 11/1970 Fukuzawa ............... C01F 5/32
423/161
2010/0051470 A1 3/2010 Nakamura et al.
(Continued)

FOREIGN PATENT DOCUMENTS

CN 103304369 9/2013
WO 2012/038330 3/2012

OTHER PUBLICATIONS

Chinese Office Action for related Chinese Patent Application No. 201380035850.9, issued Nov. 12, 2015, 15 pages.
(Continued)

*Primary Examiner* — Ciel Thomas
(74) *Attorney, Agent, or Firm* — Slayden Grubert Beard PLLC

(57) ABSTRACT

A method recovers an electropositive metal from a metal carbonate. In the method, hydrogen and halogen are combusted to form hydrogen halide. The solid metal carbonate is converted into metal chloride by a gaseous hydrogen halide. In an electrolysis, the metal chloride is decomposed into metal and halogen. The halogen produced in the electrolysis is led out of the electrolysis for combusting. Preferably, the hydrogen halide is produced by combusting the hydrogen and the halogen and the metal carbonate is con-
(Continued)

verted into metal chloride in a fluidized bed reactor. Preferably, lithium is used as the metal.

15 Claims, 2 Drawing Sheets

(51) Int. Cl.
*C25C 3/02* (2006.01)
*C22B 26/00* (2006.01)
*C22B 26/12* (2006.01)
*C25B 15/08* (2006.01)
*C25B 1/24* (2006.01)
*B01J 8/24* (2006.01)
*C25B 1/26* (2006.01)

(52) U.S. Cl.
CPC ............... *C25B 1/24* (2013.01); *C25B 1/26* (2013.01); *C25B 15/08* (2013.01); *C25C 3/00* (2013.01); *C25C 3/02* (2013.01); *Y02P 20/133* (2015.11)

(58) Field of Classification Search
CPC .. C22B 26/12; C25C 1/00; C25C 3/00; C25C 3/02; Y02P 20/133
See application file for complete search history.

(56) References Cited

U.S. PATENT DOCUMENTS

| | | |
|---|---|---|
| 2010/0233017 A1 | 9/2010 | Blencoe et al. |
| 2012/0073984 A1 | 3/2012 | Saito et al. |
| 2012/0125780 A1* | 5/2012 | Oakes ............... C25B 1/003 205/340 |

OTHER PUBLICATIONS

Georges Parissakis, "Beitrag zur Lithiumgewinnung durch Schmelzfluss-Elektrolyse," Juris Verlag Zürich, PhD Thesis, 1957, 3 pages.

Elektronegativität, Wikipedia, 5 pages, downloaded Sep. 3, 2012 http://de.wikipedia.org/wiki/Elektronegativit%C3%A4t; English version, Electronegativity, Wikipedia, 11 pages, downloaded Oct. 27, 2014, 11 pages, http://en.wikipedia.org/wiki/Electronegativity.

German Office Action for German Priority Patent Application No. 10 2012 211 710.5, issued Sep. 3, 2012, 7 pages.

English Language International Search Report for PCT/EP2013/063198, mailed Sep. 5, 2013, 2 pages.

* cited by examiner

METHOD FOR RECOVERING AN ELECTROPOSITIVE METAL FROM A METAL CARBONATE

CROSS REFERENCE TO RELATED APPLICATIONS

This application is based on and hereby claims priority to International Application No. PCT/EP2013/063198 filed on Jun. 25, 2013 and German Application No. 10 2012 211 710.5 filed on Jul. 5, 2012, the contents of which are hereby incorporated by reference.

BACKGROUND

The invention relates to a process for winning an electropositive metal from a metal carbonate, and also an arrangement for carrying out the process.

The proportion of carbon dioxide in the atmosphere has been increasing since the beginning of the 19th century because of industrialization. Carbon dioxide is a greenhouse gas. The Kyoto protocol defined reduction targets for proportions of greenhouse gases in the atmosphere in order to protect the climate. These reduction targets should be achieved by various climate protection measures. Firstly, a reduction in the emission of greenhouse gases, in particular of carbon dioxide, is necessary. This can, for example, be achieved by efficiency improvements in power generation. Furthermore, utilization of carbon dioxide as a material to produce basic chemicals or in combustion to produce energy (e.g. combustion in $CO_2$) is useful.

WO 2012/038330 discloses a process in which carbon dioxide is converted into basic chemicals. Here, carbon dioxide which has been isolated beforehand from an offgas stream is burnt using an electropositive metal. The combustion forms basic chemicals such as carbon monoxide or carbides, which can, for example, be converted by hydrolysis into acetylene. Carbon monoxide can later be reacted further with hydrogen to form methanol or other products of value (Fischer-Tropsch process). The thermal energy liberated in the combustion of the electropositive metal in carbon dioxide, or alternatively in nitrogen, can be utilized, for example, for steam generation in order to drive generators or heat separation processes. After the combustion, the metal is often present in its lowest-energy form, viz. the metal carbonate. For a circular process based on the metal to be possible, the metal carbonate has to be recycled back to the metal. This is at present effected by first converting the metal carbonate into metal chloride. Here, the metal carbonate is dissolved in aqueous hydrochloric acid solution. The metal carbonate then reacts with the aqueous hydrochloric acid to form metal chloride. The aqueous metal chloride solution is subsequently heated in order to evaporate the water and produce anhydrous metal chloride. The evaporation of water consumes large quantities of energy (www.derneue-schwan.ch/chemieberatung/question.php?q=14), which is disadvantageous.

SUMMARY

It is therefore one possible object to provide a process and an arrangement by which less energy is consumed in the preparation of an electropositive metal from a metal carbonate, in particular with the formation of hydrates being avoided from the beginning.

The inventors propose a process for winning an electropositive metal from a metal carbonate, solid metal carbonate is reacted with hydrogen halide, preferably HCl or HF, particularly preferably HCl, to form metal halide, preferably metal chloride or metal fluoride, particularly preferably metal chloride.

For the purposes of this document, an electropositive metal is a metal whose potential in the electrochemical series (relative to the standard hydrogen electrode at $E^0=0$ V) is less than −0.7 V, preferably less than −1.0 V, particularly preferably less than −2.0 V. Preferred metals are Li, Mg, Na, K, Ca and Zn, with Li, Mg, Na, K and Ca being more preferred and Li and Mg being even more preferred. Particular preference is given to Li.

The inventors also propose an arrangement for carrying out a process for winning an electropositive metal from a metal carbonate comprises a first reactor (second apparatus) for converting solid metal carbonate and gaseous, preferably anhydrous, hydrogen halide into metal halide.

In the proposed process and arrangement, preference is given to using anhydrous, gaseous hydrogen halide, preferably anhydrous HCl gas, for converting solid metal carbonate ($Me_{2/n}CO_3$) into metal halide, preferably metal chloride ($MeCl_n$), where n is the valence of the metal (for example Li: n=1, Mg: n=2).

Anhydrous here means that the gaseous hydrogen halide preferably contains less than 10% by volume of $H_2O$, more preferably less than 5% by volume of $H_2O$ and particularly preferably no water.

The following reaction equation describes an illustrative reaction of metal carbonate with the preferred HCl to form metal chloride (formula 1).

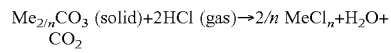

$$Me_{2/n}CO_3 \text{ (solid)} + 2HCl \text{ (gas)} \rightarrow 2/n \, MeCl_n + H_2O + CO_2$$

The reaction of solid metal carbonate ($Me_{2/n}CO_3$) with gaseous hydrogen halide, for example HCl, to form metal halide, for example metal chloride ($MeCl_n$), is preferably carried out in the first reactor (second apparatus).

The reaction can here be carried out at a pressure of 1-100 bar, preferably <20 bar, for example for HCl.

The reaction of the solid metal carbonate with the gaseous anhydrous hydrogen halide, for example gaseous HCl, can be carried out at a temperature of more than 100° C. and less than 500° C., preferably more than 150° C. and less than 400° C. and particularly preferably at from 250° C. to 350° C.

As a result of the selected temperature in the reaction of the metal carbonate with the hydrogen halide, the water formed in the reaction does not coordinate to the metal halide. The metal halide obtained in this way is therefore virtually dry, with residual water contents of <5% by weight, preferably <1% by weight, being possible. Energy-intensive vaporization of water is thus advantageously avoided and the energy consumption in the preparation of metal halide from metal carbonate is therefore lower than in the process known from the related art.

Since the metal carbonate is solid, it can be transported readily, so that the reaction can be carried out flexibly in terms of place. The conversion of the metal carbonate into metal halide, for example metal chloride, will preferably take place where gaseous hydrogen halide, for example gaseous HCl, is produced and/or is available in sufficient quantity. This is, for example, at the site of the electrolysis of metal halide, where halogen is available in a sufficient amount.

As an alternative to metal chloride, the metal carbonate can also be converted into other metal halides, for example metal fluoride or metal bromide, although metal fluoride and metal chloride are preferred and metal chloride is particularly preferred.

In the first reactor (second apparatus), the reaction gases, i.e. hydrogen halide and water and $CO_2$ formed in the reaction, as is the case, for example, in a preferred fluidized-bed reactor, can be circulated and/or discharged from the apparatus and optionally also be reused. It is also possible for a product composed of water and hydrogen halide, for example (aqueous) concentrated hydrochloric acid, which can form to be condensed within the unit and be obtained as product and used further. In the case of batch operation of the first reactor, the $CO_2$ can even be circulated until the reaction of a batch has ended in the case of an excess of gaseous hydrogen halide, for example HCl.

As metal carbonate, preference is given to using an alkali metal carbonate, for example lithium carbonate, or an alkaline earth metal carbonate, for example magnesium carbonate or calcium carbonate. Particular preference is given to using lithium carbonate. Furthermore, sodium carbonate, potassium carbonate or possibly zinc carbonate can also be used. However, the use of lithium carbonate and magnesium carbonate is preferred.

In an advantageous embodiment and further development, the optionally anhydrous, gaseous hydrogen halide, for example gaseous HCl, required for preparing the metal halide is prepared in a second reactor (fourth apparatus) for the combustion of hydrogen and halogen, for example chlorine, to form hydrogen halide, for example HCl. The halogen required for this, for example $Cl_2$, can originate from the electrolysis of metal halide and hydrogen ($H_2$) can for example, originate from a water electrolysis which is preferably operated using renewable energy.

When the first reactor (second apparatus) and the second reactor (fourth apparatus) are physically separate from one another, the heat generated in the second reactor during the combustion of hydrogen and halogen, for example chlorine, to form hydrogen halide, for example HCl, can be utilized for heating the reaction of the metal carbonate to form metal chloride in the first reactor.

As an alternative, the heating of the first reactor can be effected by use of a heating apparatus and/or heat exchangers.

In the case of an excess of heat generated in the second reactor, this can optionally be utilized for heating the electrolysis of the metal chloride in the 3rd apparatus.

In a preferred embodiment, the second reactor for preparing the metal halide, for example the HCl, is integrated into the first reactor for converting the metal carbonate into metal halide, for example metal chloride. This can, for example, be achieved by hydrogen and halogen, for example chlorine, being introduced via optionally separate nozzles or after prior mixing via a common nozzle into the first reactor (second apparatus) and being reacted there (for example by ignition), although this reaction preferably takes place in such a way that the hydrogen halide is formed before the hydrogen and the halogen come into contact with the metal carbonate. In this case, the hydrogen halide, for example the HCl gas, is formed in-situ from hydrogen and halogen, for example chlorine, in the reactor for converting the metal carbonate into metal halide. This makes direct heat transfer of the heat liberated in the preparation of the hydrogen halide, for example the HCl, possible.

In an advantageous embodiment and further development, the metal halide, for example metal chloride, obtained in the reaction of the metal carbonate is decomposed into metal and halogen in an electrolysis. The halogen formed in the electrolysis is preferably, at least partly, used for preparing the hydrogen halide.

In this way, at least part of the halogen is recycled so that the overall conversion of halogen is in the ideal case equal to zero.

Furthermore, the arrangement advantageously comprises a third apparatus for the electrolysis of metal halide, for example metal chloride, to form metal and halogen and a conduit for conveying the halogen from the third apparatus for the electrolysis to the fourth apparatus for preparing hydrogen halide.

The metal formed in the electrolysis of the metal chloride is, in an advantageous further development and embodiment, burnt with $CO_2$ to form metal carbonate.

In an advantageous embodiment, the combustion of metal and $CO_2$ takes place in a first apparatus. Since energy is liberated in this combustion, the metal can be considered to be an energy store. When the metal halide electrolysis is operated by renewable energy, it is thus possible to store at least part of the renewable energy in chemical form in the form of the metal, with this storage also being able to be carried out as a function of the availability of renewable energy as a function of the season or time of day. The energy produced in the combustion in the first apparatus can then also be used, for example, for power generation when no renewable energy is available, so that the quantity of power from renewable energy which is fed into the power grid can also be controlled or compensated as a function of the season and time of day by the storage of energy in the metal.

The reaction of the metal with $CO_2$ generates heat which can preferably be utilized for heating the operation and/or for power production, for example by generators.

The metal carbonate formed in the reaction of the metal with the $CO_2$, for example lithium carbonate, is then preferably converted back into metal halide, for example lithium chloride, by gaseous, optionally dry and hot hydrogen halide, for example hot HCl.

A cyclic lithium process is thus preferably present.

In a further advantageous embodiment and further development, the first reactor (second apparatus) is a fluidized-bed reactor. In a fluidized-bed reactor, a fluid, in particular a gas, is passed through a pulverulent material. The gas advantageously comprises the gaseous hot hydrogen halide, for example gaseous HCl. Fluidization of the solid occurs here. Above a critical value of the gas velocity, at which the upward-directed forces which move the particles upward balance the downward-directed gravitational forces, solid material behaves virtually as dynamically as a liquid. Objects having a low density are carried to the surface of the fluidized bed. This means that reacted metal halide, for example LiCl (2.07 $g/cm^3$) accumulates in the upper part of the fluidized bed and unreacted metal carbonate, for example $Li_2CO_3$ (2.11 $g/cm^3$), accumulates in the lower part.

The reaction of solid metal carbonate with gaseous hydrogen halide, for example gaseous HCl, is advantageously carried out in the fluidized-bed reactor since the solid comprising metal carbonate comes into close contact with the gas comprising gaseous hydrogen halide. Furthermore, heat transfer between the solid particles and the gas is very good since a large surface area is advantageously available for heat transfer.

The hydrogen halide can, as described above, be synthesized from hydrogen and halogen in a fourth apparatus and subsequently be introduced into the fluidized-bed reactor.

In a fluidized bed, the preparation of the hydrogen halide, for example HCl, from hydrogen and halogen can be carried out in-situ and the metal carbonate can simultaneously be converted into metal halide. The heat generated in the preparation of the hydrogen halide is thus utilized directly in the preparation of the metal halide. At the upper end of the fluidized-bed reactor, the gas may be taken off, but it can also be circulated in the fluidized-bed reactor. The gas to be taken off comprises, in particular, carbon dioxide and water. The carbon dioxide can optionally, but not preferably, be separated off and can be used in the first apparatus for the reaction of $CO_2$ with the metal. However, this recirculation of the carbon dioxide can incur increased costs. The water can contain hydrogen halide and the hydrohalic acid obtained in this way, for example hydrochloric acid, is preferably used further as basic chemical.

In the in-situ preparation of hydrogen halide in the second apparatus or the fluidized-bed reactor, preference is given to the second apparatus or the fluidized-bed reactor and the third apparatus being physically close to one another. As a result, transport of halogen from the third apparatus can occur over a short distance.

The fluidized-bed reactor preferably has two zones, with the introduced halogen, for example chlorine, reacting with the introduced hydrogen in-situ in a first zone to form hydrogen halide, for example HCl, which subsequently reacts with the metal carbonate in a second zone to form the metal halide.

In a further advantageous embodiment and further development, the hydrogen is produced by electrolysis of water. The hydrogen for the preparation of the hydrogen halide is preferably produced in this way. The oxygen formed in the electrolysis of water can be discharged as product of value.

The electrolysis of water preferably takes place in a fifth apparatus.

The energy for operating the electrolysis of metal halide to form metal and halogen and optionally for the electrolysis of water to form oxygen and hydrogen is preferably provided from excess power from renewable/regenerable energies. Thus, preference is given to using no carbon-based energy-carrying materials. As a result, no carbon dioxide is formed in the generation of energy but instead carbon dioxide is used only in the combustion with the electropositive metal, firstly for forming the metal carbonate and secondly optionally for forming relatively high-value carbon products such as acetylene, for example from metal carbide and CO, which are formed in the reaction of the carbon dioxide with the electropositive metal, which is advantageous for the recycling process.

Renewable/regenerable energies here include energy from power generation by wind power, water power, solar plants, geothermal plants, tidal plants or similar plants, with preference being given to using excess power from such plants which cannot be fed into the grid.

The arrangement has at least one apparatus selected from the group consisting of a first apparatus for the reaction of carbon dioxide, a second apparatus for the preparation of metal halide, a third apparatus for the electrolysis of metal halide, a fourth apparatus for preparing hydrogen halide and a fifth apparatus for the electrolysis of water.

The metal, for example lithium, the metal carbonate, for example lithium carbonate, and the metal halide, for example lithium chloride, are present as solids. These components can therefore be readily transported, for example by containers on ships.

The apparatuses can therefore also be at least partly arranged at different sites, in particular at a distance from one another, i.e. at a distance of several kilometers, preferably more than 100 kilometers, from one another.

The arrangement also preferably has a conduit for transporting the materials used or formed in the process; the arrangement particularly preferably has at least one of the following transport devices:

A first device for transporting metal carbonate, for example lithium carbonate ($Li_2CO_3$), from the first apparatus for the reaction of $CO_2$ to the second apparatus for preparation of the metal halide.

A second device for transporting metal halide, for example lithium chloride (LiCl), from the second apparatus for the preparation of metal halide to the third apparatus for the electrolysis of metal halide.

A third device for transporting metal, for example lithium, from the third apparatus for the electrolysis of metal halide to the first apparatus for the reaction of $CO_2$.

A fourth device for transporting hydrogen halide, for example HCl, from the fourth apparatus for the preparation of hydrogen halide to the second apparatus for the preparation of metal halide.

A fifth device for transporting hydrogen ($H_2$) to the fourth apparatus for preparing hydrogen halide or to the second apparatus for the preparation of metal halide or the fluidized-bed reactor.

A sixth device for transporting halogen, for example chlorine ($Cl_2$), from the third apparatus for the electrolysis of metal halide to the fourth apparatus for the preparation of hydrogen halide or to the second apparatus for the preparation of metal halide or the fluidized-bed reactor.

A seventh device for transporting water ($H_2O$) and/or concentrated hydrochloric acid from the second apparatus for the preparation of metal halide or the fluidized-bed reactor.

An eighth device for transporting carbon dioxide ($CO_2$) from the second apparatus for the preparation of metal halide or the fluidized-bed reactor to the first apparatus for the reaction of $CO_2$. However, carbon dioxide can also be provided in other ways in the first apparatus, for example from other plants such as combustion plants or power stations. In particular embodiments, carbon dioxide is used in excess in the first apparatus, so that further products such as metal carbide and CO can also be formed.

A ninth device for transporting oxygen ($O_2$) from the fifth apparatus for the electrolysis of water.

A tenth device for transporting water ($H_2O$) into the fifth apparatus for the electrolysis of water.

Appropriate transport devices will be well known to those skilled in the art; it is possible to use, for example, any transport device, for example a ship or goods trains provided with suitable containers as devices for transport. A person skilled in the art will know the design of containers which are suitable for transport of the respective materials and will adapt the containers to the relevant use.

As an alternative, the transport device(s) can be a piping system and/or system of conveyor belts having at least one pipe or a conveyor belt, i.e. the apparatuses connected by the transport device are in flow connection with one another and continuous material flow can be ensured. Piping systems or conveyor systems which are suitable for use of the respective materials will be well known to those skilled in the art and such persons will select suitable materials in each case.

The arrangement can have any combinations of piping systems, conveyor belts and other transport devices.

In addition, the fourth and fifth apparatuses preferably have a way to introduce energy.

The first apparatus preferably has a device for the removal of waste heat.

The fourth apparatus preferably has a device for the removal of waste heat and/or optionally a third device for the removal of waste heat, with the second device for the removal of waste heat supplying the waste heat to the second apparatus, i.e. providing waste heat for the preparation of the metal halide, and the third device for the removal of waste heat supplying the waste heat to the third apparatus, i.e. to the metal halide electrolysis.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
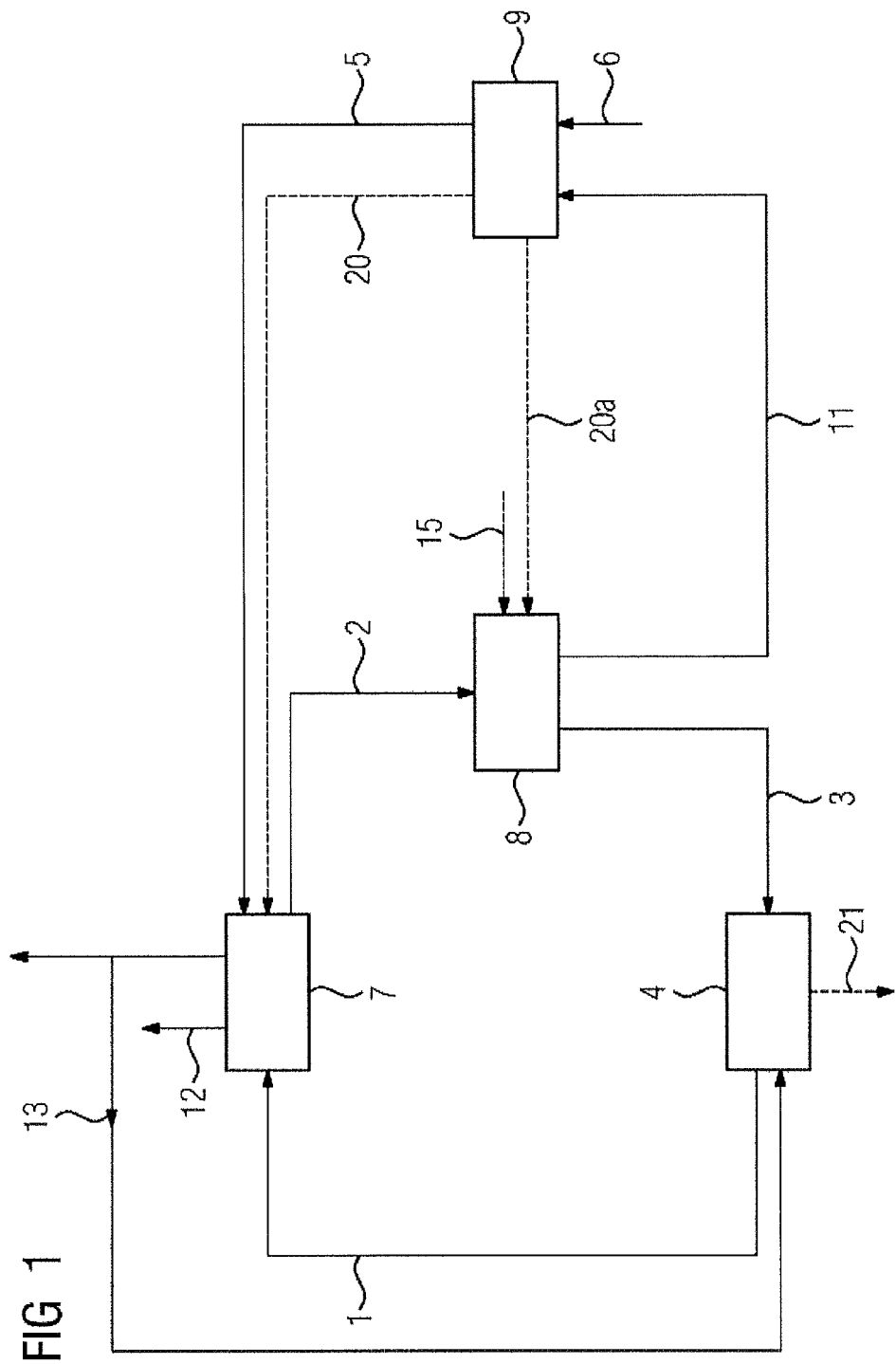
FIG. 1 shows a schematic diagram of a potential embodiment of the inventors' proposed arrangement for preparing lithium as illustrative metal from lithium carbonate, having a second apparatus (reactor) 7 for the preparation of lithium chloride as illustrative metal halide and a third apparatus 8 for lithium electrolysis.

Reference will now be made in detail to the preferred embodiments of the present invention, examples of which are illustrated in the accompanying drawings, wherein like reference numerals refer to like elements throughout.

FIG. 1 schematically shows an illustrative arrangement for preparing lithium from lithium carbonate.

A potential embodiment of the arrangement for carrying out the proposed process comprises a first apparatus 4 for the reaction of $CO_2$, a second apparatus 7 for the preparation of lithium chloride, a third apparatus 8 for the electrolysis of lithium chloride and a fourth apparatus (reactor) 9 for the preparation of hot HCl gas.

The first apparatus 4 for the reaction of $CO_2$ is supplied with lithium via a device for the transport 3 of lithium from the third apparatus 8 and carbon dioxide via a device for the transport 13 of carbon dioxide 13, preferably from the second apparatus 7. Carbon dioxide can, however, also be fed in another way to the first apparatus 4 in order to form further relatively high-value carbon products such as acetylene from metal carbide formed and CO by excess carbon dioxide (not shown). The reaction of lithium and carbon dioxide in the first apparatus 4 for the reaction of $CO_2$ forms lithium carbonate, which has a lower energy content than lithium. The first waste heat generated in the reaction of lithium with $CO_2$ is removed via a first device for the removal of waste heat 21 from the first apparatus 4 and is preferably utilized for heating operating materials or for power generation by generators. The lithium carbonate formed is converted back into lithium and thus recycled in order, preferably, to be ultimately fed back into the first apparatus 4. A cyclic lithium process in which the lithium can serve as energy store is thus preferably present.

The lithium carbonate is firstly transferred via a first device for the transport 1 of lithium carbonate into the second apparatus 7 for the preparation of lithium chloride.

Since the lithium carbonate 1 is present in solid form and thus can be transported readily, the first device for the transport 1 of lithium carbonate can be, for example, any transport device, for example a ship or goods train provided with appropriate containers and the lithium carbonate is transported by shipping or goods train containers to the second apparatus 7. As an alternative, the first device for the transport 1 of lithium carbonate can be, for example, a piping system and/or conveyor system having at least one pipe or conveyor belt, i.e. the first apparatus 4 is in flow connection with the second apparatus 7. In addition, HCl from the fourth apparatus 9 for the preparation of HCl is fed via a fourth device for the transport 5 of the HCl gas to the second apparatus 7. As an alternative, HCl formed in another production process, for example as by-product/waste product, can be fed via a fourth device for the transport 5 of HCl to the second apparatus 7. In the second apparatus 7, the lithium carbonate is reacted with the gaseous anhydrous HCl to form lithium chloride, water and carbon dioxide, preferably at a temperature of at least 300° C. (reaction equation as per formula 1, where Me=Li; reaction enthalpy=−96 kJ/mol). The water and/or concentrated hydrochloric acid and the carbon dioxide are discharged from the second apparatus 7 via a seventh device 12 for the transport of water and/or concentrated hydrochloric acid and an eighth device 13 for the transport of carbon dioxide. Preference is given to at least part of the carbon dioxide formed being fed via an eighth device for the transport 13 of carbon dioxide back to the first apparatus 4 for the reaction of $CO_2$. As an alternative, if the second apparatus 7 and the first apparatus 4 are arranged at a distance from one another, the carbon dioxide from the second apparatus 7 is not recirculated to the first apparatus 4 but instead stored and used further in another process. The water formed in the reaction of lithium carbonate with HCl can optionally combine with excess HCl to form aqueous hydrochloric acid. Since only little water is formed and HCl is present in excess, the hydrochloric acid is concentrated. This concentrated hydrochloric acid can be used further as basic chemical.

The lithium chloride obtained by reaction by the process or by the arrangement is obtained as virtually dry solid and is transferred via a second device for the transport 2 of lithium chloride to the third apparatus 8 for the electrolysis of lithium chloride. In the third apparatus 8, the lithium chloride is converted electrolytically into lithium and chlorine. For this purpose, the apparatus 8 has a device for supplying energy 15. The electric energy required for the electrolysis preferably originates from renewable energies. The lithium formed in the electrolysis is fed via a third device for the transport 3 of lithium back to the first apparatus 4, so that a "lithium" circuit is formed. The chlorine formed in the electrolysis of the lithium chloride is conveyed from the third apparatus 8 via a sixth device for the transport 11 of chlorine to the fourth apparatus 9 for the preparation of HCl. The fourth apparatus 9 is also supplied with hydrogen via a fifth device for the transport 6 of hydrogen. The hydrogen can originate from any source; for example, it can be obtained by electrolysis of water. An appropriate apparatus for the electrolysis of water is described in the embodiment as per FIG. 2 and can correspondingly also be used in the embodiment as per FIG. 1.

In the fourth apparatus 9, the hydrogen reacts with the chlorine to form HCl. This reaction is exothermic (reaction enthalpy=−92.31 kJ/mol). The second waste heat produced is preferably conveyed via a second device for the removal of waste heat 20 to the second apparatus 7 and utilized there in the preparation of lithium chloride from lithium carbonate. In addition, the waste heat can optionally be conveyed via a third device for the removal of waste heat 20a to the third apparatus 8 and utilized there, for example for operating generators. The HCl gas formed in the reaction of hydrogen with chlorine in the fourth apparatus 9 is fed to the second apparatus 7 via a fourth device for the transport 5 of HCl.

Figure 2:
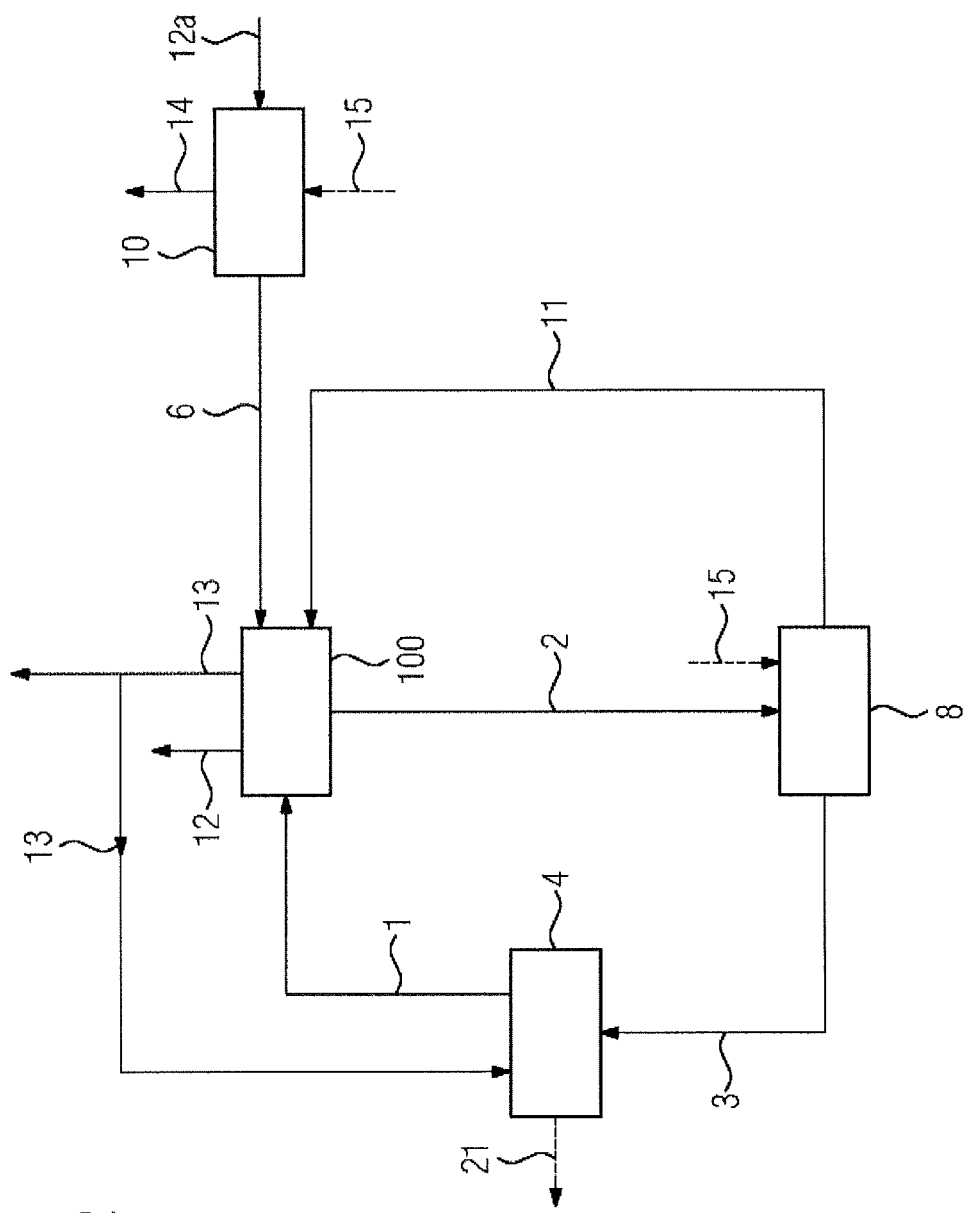
FIG. 2 shows a schematic diagram of an alternative illustrative arrangement for preparing lithium as illustrative metal from lithium carbonate using a fluidized-bed reactor 100 and in-situ preparation of HCl as illustrative hydrogen halide in the fluidized-bed reactor 100.

FIG. 2 schematically shows an alternative arrangement for preparing lithium from lithium carbonate using a fluidized-bed reactor 100 and in-situ preparation of HCl in the fluidized-bed reactor 100.

The example shown in FIG. 2 differs from the example shown in FIG. 1 in that in the case of the example as per FIG. 2 the second apparatus 7 for the preparation of lithium chloride and the fourth apparatus 9 for the preparation of HCl are integrated in one reactor, with this reactor being configured as a fluidized-bed reactor 100. In addition, the arrangement as per the embodiment shown in FIG. 2 has a fifth apparatus 10 for the electrolysis of water.

Otherwise, the arrangement of FIG. 2 comprises a first apparatus 4 for the reaction of carbon dioxide and a third apparatus 8 for lithium electrolysis.

The first apparatus 4 for the reaction of $CO_2$ is supplied with lithium via a device for the transport 3 of lithium from the third apparatus 8 and carbon dioxide via a device for the transport 13 of carbon dioxide 13, preferably from the second apparatus 7. In addition, carbon dioxide can also be fed in from other sources, so that carbon dioxide can be present in excess (not shown). Lithium carbonate, which has a lower energy content than lithium, is formed by the reaction of lithium and carbon dioxide in the first apparatus 4 for the reaction of $CO_2$. The first waste heat produced in the reaction of lithium with $CO_2$ is removed via a first device for the removal of waste heat 21 from the first apparatus 4 and is utilized industrially, for example for heating operating materials or for power generation. The lithium carbonate formed is converted back into lithium and thus recycled so as to be ultimately preferably returned again to the first apparatus 4. A cyclic lithium process is therefore preferably present.

The lithium carbonate is firstly transferred via a first device for the transport 1 of lithium carbonate into the fluidized-bed reactor 100 for the preparation of lithium chloride.

Since the lithium carbonate 1 is present in solid form and therefore can be readily transported, the first device for the transport 1 of lithium carbonate can be any transport device, for example a ship or goods train provided with appropriate containers and the lithium carbonate is transported by shipping or goods train containers to the fluidized-bed reactor 100. The fluidized-bed reactor 100 is preferably located at the site at which the lithium electrolysis takes place in the third apparatus 8. As an alternative, the first device for the transport 1 of lithium carbonate can be, for example, a piping system and/or a conveyor system having at least one pipe or at least one conveyor belt, i.e. the first apparatus 4 is in flow connection with the fluidized-bed reactor 100.

The fluidized-bed reactor 100 can be more than 500 km away from the first apparatus 4. In addition, hydrogen and chlorine are fed to the fluidized-bed reactor. Hydrogen is brought via a fifth device for the transport 6 of hydrogen, and chlorine is brought via a sixth device for the transport 11 of chlorine. The chlorine originates from the third apparatus 8 for the electrolysis of lithium chloride. The hydrogen originates from the fifth apparatus 10 for the electrolysis of water.

In the fifth apparatus 10, the water is converted into hydrogen and oxygen by electrolysis. For this purpose, the fifth apparatus 10 has a device for the transport 12a of water and also a device for introducing energy 15. The electric energy required for the electrolysis preferably originates from renewable energies.

The oxygen formed in the electrolysis is obtained as material of value and is discharged from the fifth apparatus 10 via a ninth device for the transport 14 of oxygen or can also be discharged into the air. Both the in-situ preparation of the HCl gas from chlorine and hydrogen and the reaction of the HCl formed in situ with lithium carbonate to form lithium chloride take place in the fluidized-bed reactor 100. As a result, the heat generated in the preparation of the HCl can be utilized directly in the conversion of the lithium carbonate into lithium chloride. In the fluidized-bed reactor 100, the solids lithium carbonate and lithium chloride are mixed with the gaseous HCl so that the reaction is not mass-transfer-limited.

Owing to the high temperatures of at least 300° C. in the fluidized-bed reactor 100, the water does not coordinate to the lithium chloride, so that dry lithium chloride is obtained.

The carbon dioxide and the water and/or concentrated hydrochloric acid formed in the preparation of the lithium chloride are discharged from the fluidized-bed reactor 100 via a seventh device 12 for the transport of water and/or concentrated hydrochloric acid and an eighth device for the transport 13 of carbon dioxide. Optionally, at least part of the carbon dioxide formed is conveyed via an eighth device for the transport 13 of carbon dioxide back to the first apparatus 4 for the reaction of $CO_2$. As an alternative, if the fluidized-bed reactor 100 and the first apparatus 4 are at a distance from one another, the carbon dioxide from the fluidized-bed reactor 100 is not recirculated to the first apparatus 4 but instead passed on and optionally stored and utilized further in another process. The water formed in the reaction of lithium carbonate with HCl can optionally combine with the HCl to form hydrochloric acid. This concentrated hydrochloric acid can be used further as basic chemical.

The lithium chloride obtained by reaction by the process or by the arrangement is obtained as a virtually dry solid and is transferred via a second device for the transport of lithium chloride into the third apparatus 8 for the electrolysis of lithium chloride. In the third apparatus 8, the lithium chloride is converted into lithium and chlorine by electrolysis. For this purpose, the apparatus 8 has a device for introducing energy 15. The electric energy required for the electrolysis preferably originates from renewable energies. The lithium formed in the electrolysis is conveyed via a third device for the transport 3 of lithium back to the first apparatus 4, so that a "lithium" circuit is formed. The chlorine formed in the electrolysis of the lithium chloride is conveyed from the third apparatus 8 via a sixth device for the transport 11 of chlorine to the fluidized-bed reactor 100 for the in-situ preparation of HCl. Preference is thus given to the fluidized-bed reactor 100 and the third apparatus 8 being located close to one another.

The lithium, the lithium carbonate and the lithium chloride are present as solids. These components can therefore be transported readily, for example by containers on ships. The reactors and apparatuses can therefore be arranged at different sites.

As an alternative, the hydrogen fed to the fluidized-bed reactor 100 can also originate from another source and not be obtained by electrolysis of water.

In a further alternative embodiment, the arrangement shown in FIG. 1 can be modified so that not HCl but instead hydrogen and chlorine are fed to the second apparatus for the preparation of lithium chloride, corresponding to the configuration in the embodiment as per FIG. 2, and the HCl gas is formed in situ in the second apparatus.

In a further alternative embodiment, the arrangement as per FIG. 1 can be modified so that the second apparatus 2 is replaced by a fluidized-bed reactor 100 and the reaction of lithium carbonate with HCl is carried out in the fluidized-bed reactor 100.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A process for recovering an electropositive metal from a solid metal carbonate, comprising:
    in a carbonate-halide reaction process, reacting a portion of the solid metal carbonate with a gaseous hydrogen halide to produce a portion of dry metal halide;
    performing an electrolysis of the portion of dry metal halide to yield the electropositive metal and a halogen;
    reacting the electropositive metal, in an unreacted, unstable electropositive state, with carbon dioxide to produce a further portion of the solid metal carbonate; and
    using the halogen to prepare further gaseous hydrogen halide for reaction with the further portion of the solid metal carbonate in the carbonate-halide reaction process to produce a further portion of dry metal halide.

2. The process as claimed in claim 1, wherein the solid metal carbonate is an alkali metal carbonate.

3. The process as claimed in claim 2, wherein the alkali metal carbonate is lithium carbonate.

4. The process as claimed in claim 1, wherein the solid metal carbonate is an alkaline earth metal carbonate.

5. The process as claimed in claim 4, wherein the alkaline earth metal carbonate is magnesium or calcium carbonate.

6. The process as claimed in claim 1, further comprising forming the further gaseous hydrogen halide by combusting hydrogen and the halogen.

7. The process as claimed in claim 6, wherein the halogen is chlorine,
    the combusting of the hydrogen and the chlorine generates heat, and
    the heat generated while combusting the hydrogen and the chlorine heats the carbonate-halide reaction process.

8. The process as claimed in claim 7, wherein the carbonate-halide reaction is carried out at a temperature of at least 100° C.

9. The process as claimed in claim 8, wherein
    the further gaseous hydrogen halide is formed from hydrogen and chlorine, and
    the hydrogen used to form the further gaseous hydrogen halide is produced by water electrolysis.

10. The process as claimed in claim 9, wherein excess power from renewable energy is used for the electrolysis of the metal halide and the water electrolysis.

11. The process as claimed in claim 1, wherein
    the carbonate-halide reaction process is carried out at a temperature of at least 100° C.

12. The process as claimed in claim 1, wherein the halogen is chlorine.

13. The process as claimed in claim 1, wherein
    the further gaseous hydrogen halide is formed from hydrogen and the halogen, and
    the hydrogen used to form the further gaseous hydrogen halide is produced by water electrolysis.

14. The process as claimed in claim 13, wherein excess power from renewable energy is used for at least one of the electrolysis of the metal halide and the water electrolysis.

15. The process as claimed in claim 1, comprising reacting the electropositive metal, in the unreacted, electropositive state, with carbon dioxide to produce (a) the further portion of the solid metal carbonate and (b) acetylene.

* * * * *